Feb. 16, 1932.     J. F. COLLINS     1,845,958
NUT LOCK
Filed July 29, 1929
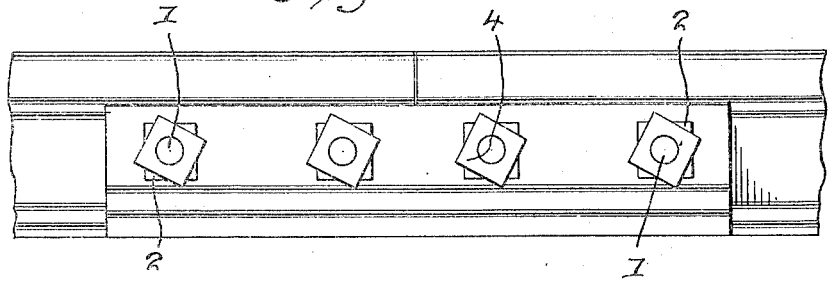
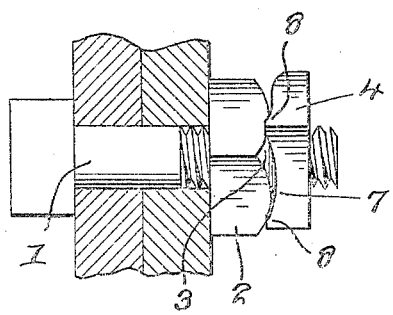
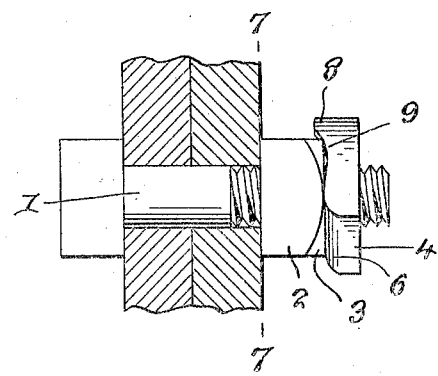
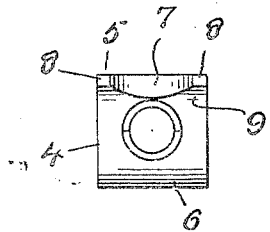
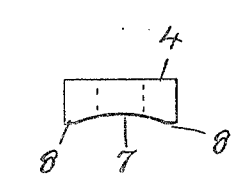
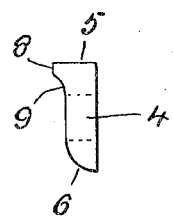
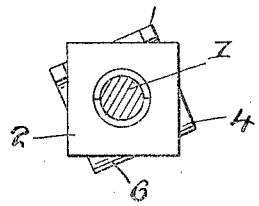
J. F. Collins
INVENTOR
BY Victor J. Evans
ATTORNEY Patented Feb. 16, 1932

1,845,958

UNITED STATES PATENT OFFICE

JAMES F. COLLINS, OF PITTSBURGH, PENNSYLVANIA, ASSIGNOR TO WILLIAM F. PHILLIPS, OF COLLINGSWOOD, NEW JERSEY

NUT LOCK

Application filed July 29, 1929. Serial No. 381,857.

My present invention has reference to an improved nut lock which employs the elastic gripping action of a plate or washer for securely holding the nut from unscrewing, and also for securely holding the washer against dislodgment.

A further object is to simplify and improve the construction of nut locks upon which I have been granted Patent No. 1,272,380, dated July 16, 1918.

To the attainment of the foregoing the invention consists in the improvement hereinafter described and definitely claimed.

In the drawings:

Figure 1 is a view illustrating a rail joint having nuts locked on bolts in accordance with this invention.

Figure 2 is a side transverse elevation, showing a bolt passing through connected plates and illustrating the nut locked on the bolt in accordance with this invention.

Figure 3 is a view taken at right angles to the showing in Figure 2.

Figure 4 is an inner face view of the elastic or resilient washer.

Figure 5 is an end view thereof.

Figure 6 is a side elevation thereof.

Figure 7 is a sectional view approximately on the line 7—7 of Figure 3.

While in Figure 1 of the drawings I have illustrated my improved nut lock in connection with a rail joint, it is to be understood that the same is not to be thus restricted in its useful capacity as the improvement may be employed in any connection where a nut is to be locked on a bolt.

Referring now to the drawings the numeral 1 designates an ordinary bolt and 2 an ordinary nut which is screwed on the bolt. The nut has its outer face, from its corners rounded or curved in the usual manner, as indicated by the numeral 3. In carrying out my invention I screw on the bolt 1 an elastic or resilient washer 4. The washer is of a less thickness than that of the bolt and the outer face of said washer is flat. The washer has one of its ends thickened, as at 5, the second end of the washer being rounded, as at 6. The thickened end 5 of the washer is concaved from points adjacent to the corners thereof, as indicated by the numeral 7. This provides the corners of the said thickened portions of the washer with projections in the nature of lugs 8 and the inner faces of the said lugs, as well as the inner face of the thickened portion or end 5 of the washer 4 are concaved, as at 9.

The nut 2 is screwed home on the bolt and thereafter the washer 4 is also screwed on the bolt. The washer is tightened on the bolt until the lugs 8 ride off of the rounded corners 3 of the nut 2 so that they will contact with the outwardly rounded surfaces of the said nut between the said corners. The washer will yield to permit of the turning thereof but when brought into the position illustrated by Figures 2 and 3 of the drawings the body of the washer and the lugs 8 will so bind against the nut that the accidental turning of the nut or of the washer is effectively prevented. Therefore, to unscrew the nut it is necessary that the washer be first backed off over the nut.

The construction is simple, may be cheaply manufactured and marketed and will be found thoroughly effective for its purpose.

Having described the invention, I claim:

A bolt having a nut screwed thereon and said nut, at its outer face having its corners rounded inwardly, an elastic washer designed to be screwed on the bolt having one of its ends thickened inwardly and its said end concaved from the sides of the washer to provide projecting lugs, and the inner walls of the lugs and the said thickened portion of the washer being rounded inwardly to the inner face of said washer, whereby the washer, when screwed home on the bolt will have the lugs thereof ride off of the convexed corners and onto the rounded face of the nut between said corners and exert a frictional binding action against the nut.

In testimony whereof I affix my signature.

JAMES F. COLLINS.